(12) United States Patent
Tomioka

(10) Patent No.: US 12,014,098 B2
(45) Date of Patent: Jun. 18, 2024

(54) SERVER, CONTROL METHOD, AND STORAGE MEDIUM

(71) Applicant: CANON KABUSHIKI KAISHA, Tokyo (JP)

(72) Inventor: Yu Tomioka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/045,962

(22) Filed: Oct. 12, 2022

(65) Prior Publication Data

US 2023/0119508 A1 Apr. 20, 2023

(30) Foreign Application Priority Data

Oct. 15, 2021 (JP) .................................. 2021-169498

(51) Int. Cl.
*G06F 3/12* (2006.01)
(52) U.S. Cl.
CPC .......... *G06F 3/1255* (2013.01); *G06F 3/1205* (2013.01); *G06F 3/1232* (2013.01)

(58) Field of Classification Search
CPC .... G06F 3/1232; G06F 3/1205; G06F 3/1255; G06F 3/1204; G06F 3/1265; G06F 3/1267; G06F 3/1288
See application file for complete search history.

(56) References Cited

U.S. PATENT DOCUMENTS

2019/0129669 A1* 5/2019 Takahashi ............. G06F 3/1271
2020/0201585 A1* 6/2020 Miyajima ............. G06F 3/1207

FOREIGN PATENT DOCUMENTS

JP 2021013051 A 2/2021

* cited by examiner

*Primary Examiner* — John R Wallace
(74) *Attorney, Agent, or Firm* — Canon U.S.A., Inc. IP Division

(57) ABSTRACT

A predetermined server provides a performance unit configured to perform, in a case where a print job for push printing is transmitted from the terminal apparatus, push printing processing to cause the printing apparatus to perform the push printing based on the print job for the push printing and a setting detail of a print setting for the push printing, without a user operation on the printing apparatus after the print job for the push printing is transmitted from the terminal apparatus.

19 Claims, 13 Drawing Sheets

FIG. 8

| | STORED PRINT JOB LIST | | |
|---|---|---|---|
| | JOB NAME (801) | DATE (802) | |
| ☑ | sample.pdf | 2021/9/25 15:00 | ~803 |
| ☐ | TEST PRINT.ppt | 2021/9/25 14:10 | ~804 |
| ☐ | AppName test.docx | 2021/9/25 14:05 | ~805 |
| | | [DELETE] | |

800

806

SERVER, CONTROL METHOD, AND STORAGE MEDIUM

BACKGROUND

Field of the Disclosure

The present disclosure relates to a server, a control method, and a storage medium.

Description of the Related Art

Japanese Patent Application Laid-Open No. 2021-013051 discusses a configuration in which an external server outside a printing apparatus is used to instruct the printing apparatus to perform printing.

Using an external server outside a printing apparatus to instruct the printing apparatus to perform printing has become popular, and therefore there is a demand for improved forms of the configuration.

SUMMARY

Embodiments of the present disclosure is provided to meet the demand and is directed to an improved form of the configuration for using an external server outside a printing apparatus to instruct the printing apparatus to perform printing.

According to embodiments of the present disclosure, a predetermined server includes a change unit configured to perform change processing for changing a setting detail of a print setting input to a terminal apparatus outside the predetermined server, a transmission unit configured to transmit, to a printing apparatus outside the predetermined server, setting display information for displaying of a setting detail of a print setting for pull printing, and a performance unit configured to perform, in a case where a print job for push printing is transmitted from the terminal apparatus, push printing processing to cause the printing apparatus to perform the push printing based on the print job for the push printing and a setting detail of a print setting for the push printing, without a user operation on the printing apparatus after the print job for the push printing is transmitted from the terminal apparatus, and configured to perform, in a case where a print job for the pull printing is transmitted from the terminal apparatus, pull printing processing to cause the printing apparatus to perform the pull printing based on the print job for the pull printing and the setting detail of the print setting for the pull printing, in response to a user operation on the printing apparatus after the print job for the pull printing is transmitted from the terminal apparatus, wherein, in a case where at least one setting detail of the print setting for the push printing input to the terminal apparatus does not satisfy a predetermined condition based on the printing apparatus, the push printing processing is performed after the change processing for changing the setting detail, of the print setting for the push printing, not satisfying the predetermined condition to a setting detail satisfying the predetermined condition is performed, and wherein, in a case where at least one setting detail of the print setting for the pull printing input to the terminal apparatus does not satisfy the predetermined condition, the setting display information is transmitted to the printing apparatus without the change processing for changing the setting detail, of the print setting for the pull printing, not satisfying the predetermined condition to a setting detail satisfying the predetermined condition.

Further features of the present disclosure will become apparent from the following description of exemplary embodiments with reference to the attached drawings.

BRIEF DESCRIPTION OF THE DRAWINGS

FIG. 8 is a diagram illustrating an example of a list screen.

DESCRIPTION OF THE EMBODIMENTS

Various exemplary embodiments of the present disclosure will be described below with reference to the drawings. It should be understood that changes and modifications that are made to the below-described exemplary embodiments as needed based on ordinary knowledge of a person skilled in the art without departing from the spirit of the present disclosure are also encompassed within the scope of the present disclosure.

<System Configuration>

Figure 1:
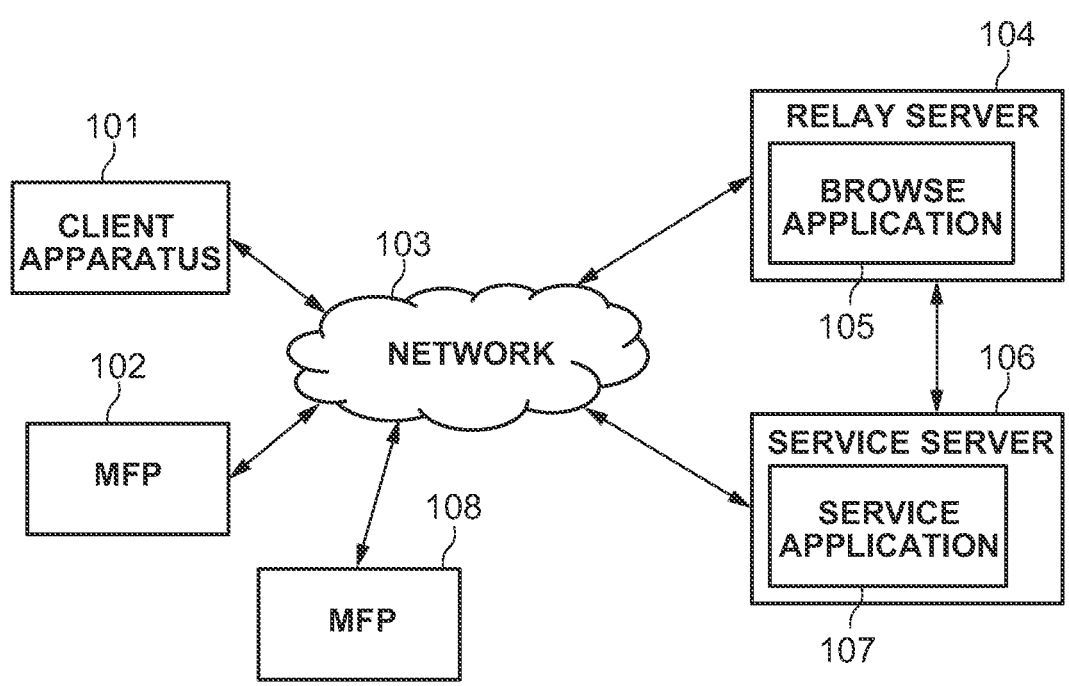
FIG. 1 is a diagram illustrating a configuration of a service integration system.

FIG. 1 is a diagram illustrating a configuration of a service integration system including a relay server according to an exemplary embodiment. The service integration system in FIG. 1 includes a client apparatus 101, a multi-function peripheral (MFP) 102, a relay server 104, a service server 106, and a MFP 108. Each of the components can communicate with a communication partner apparatus via a network 103 in a case where an address of the communication partner apparatus is acquired. Examples of the network 103 are a local area network (LAN), a wide area network (WAN), a telephone line, and a dedicated digital line. Other examples are an Asynchronous Transfer Mode (ATM) line, a frame relay line, a cable television line, and a wireless line for data broadcasting. Another example is a combination of any of those described above, i.e., a communication network, such as the Internet. According to the present exemplary embodiment, communication between the MFP 102 and the relay server 104, communication between the client apparatus 101 and the service server 106, communication between the MFP 108 and the service server 106, and communication between the relay server 104 and the service server 106 are performed via the Internet.

The client apparatus 101 corresponds to a first information processing apparatus and is a personal computer (PC)

according to the present exemplary embodiment. The client apparatus 101 is not limited to a PC, and various information processing apparatuses, such as mobile terminals, smartphones, tablet terminals, personal digital assistants (PDAs), and digital cameras are applicable to the client apparatus 101. According to the present exemplary embodiment, the client apparatus 101 includes a web browser and displays a screen corresponding to a service provided by the relay server 104 using the web browser.

The MFP 102 is a multi-function peripheral including a plurality of functions, such as a copy function, a facsimile function, and a print function, and is a printer that performs the print function using an inkjet method. Further, the MFP 102 includes a web browser and displays a screen corresponding to a print service provided by the relay server 104 using the web browser. Further, the MFP 102 can perform printing using the print service provided by the service server 106 via communication with the relay server 104.

The MFP 108 is a multi-function peripheral including a plurality of functions, such as a copy function, a facsimile function, and a print function, and is a printer (image forming apparatus) that performs the print function using an electrophotographic method. Further, the MFP 108 includes the web browser and displays a screen corresponding to a print service provided by the service server 106 using the web browser. According to the present exemplary embodiment, the MFP 108 can neither communicate with the relay server 104 nor use a first print service provided by the relay server 104. However, the MFP 108 can communicate with the service server 106 without communication with the relay server 104. Further, the MFP 108 can perform printing using a second print service provided by the service server 106 via communication with the service server 106.

The relay server 104 corresponds to a second information processing apparatus and is a server that provides the first print service to the client apparatus 101 and the MFP 102. The relay server 104 includes a browse application program 105. Hereinafter, each application program will be referred to as an "application". The first print service is a print service that causes the MFP 102 to print content (data, such as image data and document files) transmitted and provided to the MFP 102 via the Internet from a cloud server outside the MFP 102. Specifically, according to the present exemplary embodiment, the MFP 102 can perform cloud printing for printing of content transmitted to the MFP 102 from a server outside the MFP 102. According to the present exemplary embodiment, content that is printable by the first print service includes content transmitted from the second print service described below. Examples of content that is printable by the first print service include content transmitted from another service, such as a social networking service or an online storage service. Further, the browse application 105 is a program that provides a screen for the first print service. The screen is displayed by the web browser of the client apparatus 101 or the web browser of the MFP 102 in a case where the relay server 104 is accessed by the client apparatus 101 or the MFP 102. The relay server 104 is not limited to a single information processing apparatus (e.g., a single server PC) and can be configured with a plurality of information processing apparatuses (e.g., a plurality of server PCs).

The service server 106 corresponds to a third information processing apparatus and is a server that provides the second print service to the client apparatus 101 and the MFPs 102 and 108. The service server 106 includes a service application 107. The second print service is a service that causes a printer, such as the MFPs 102 and 108, to perform printing in response to an instruction from individual accounts generated on the service and manages information about printing performed based on instructions from the accounts. Examples of the information about printing performed based on instructions from the accounts are information about the amounts of recording materials (inks, toners) consumed by the printing performed based on the instructions from the accounts, information about the number of sheets consumed by the printing performed based on the instructions from the accounts, and information about contents printed by the printing. Each piece of information managed by the second print service can be browsed by an administrator managing the accounts. Further, the service application 107, for example, receives an uploaded content from a user and manages the uploaded content on the service server 106. The content managed by the service server 106 can be browsed on the client apparatus 101, the web browsers of the MFPs 102 and 108, and other graphical user interfaces (GUIs). The service server 106 is not limited to a single information processing apparatus (e.g., single server PC) and can be configured with a plurality of information processing apparatuses (e.g., a plurality of server PCs).

<Schematic Configurations of Apparatuses>

Figure 2:
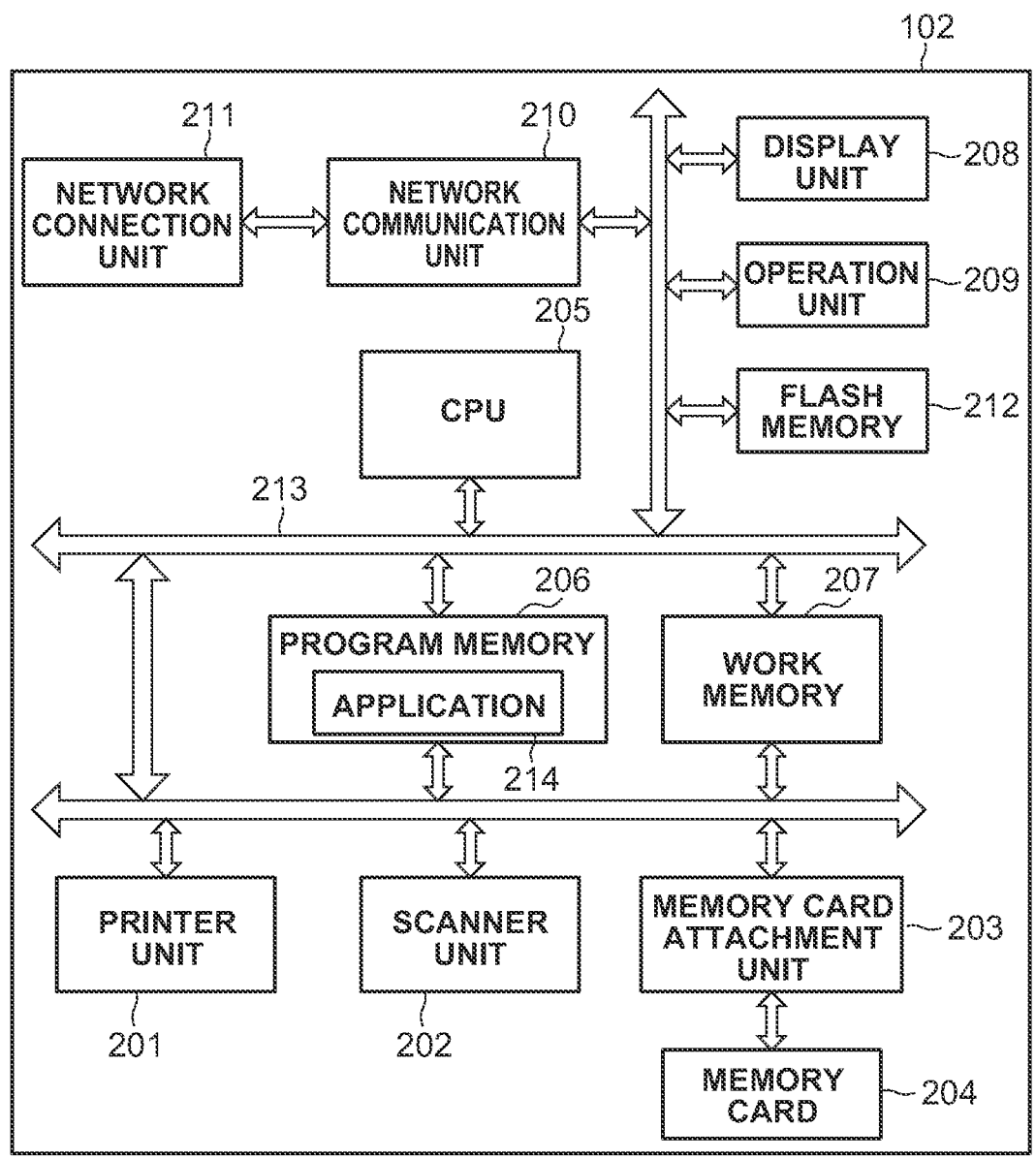
FIG. 2 is a block diagram illustrating a schematic configuration of an image forming apparatus.

FIG. 2 is a block diagram illustrating a schematic configuration of the MFP 102. The print function of the MFP 102 is realized by a printer unit 201. The scanner function of the MFP 102 is realized by a scanner unit 202. The storage function of the MFP 102 is realized by a memory card attachment unit 203 and a memory card 204.

The printer unit 201 prints externally-received image data or image data stored in the memory card 204 on a print sheet using a recording method, such as the inkjet method and the electrophotographic method. Further, the printer unit 201 manages ink information including an ink level and sheet information including the number of stored sheets.

The scanner unit 202 optically scans a document set on a platen glass (not illustrated), converts the scanned document into electronic data, converts the electronic data into image data in a designated file format, and transmits the image data to an external apparatus via a network or stores the image data in a storage area (not illustrated), such as a hard disk drive (HDD). The copy function is realized by transferring image data generated by the scanner unit 202 scanning a document placed on the platen glass to the printer unit 201 and performing printing based on the image data by the printer unit 201.

The memory card 204 attached to the memory card attachment unit 203 stores various types of file data. The file data can be read from an external apparatus via a network and can be edited. File data can be stored in the memory card 204 from an external apparatus.

Further, the MFP 102 includes a central processing unit (CPU) 205, a program memory 206, a work memory 207, a display unit 208, an operation unit 209, a network communication unit 210, a network connection unit 211, and a flash memory 212. The CPU 205 controls the components of the MFP 102. The program memory 206 includes a read-only memory (ROM) and stores various program codes and an application 214 for communicating with server apparatuses. Further, the application 214 accesses the printer unit 201 and acquires consumables information about consumables, such as inks and sheets. The work memory 207 includes a random access memory (RAM), and image data is temporarily stored and buffered in the work memory 207 while a service is performed. The display unit 208 includes, for example, a liquid crystal display (LCD) and displays various types of information. The operation unit 209 includes a switch, and a user performs various input operations using the switch. The network communication unit 210 connects the MFP 102 to a network and performs various communications. A connection to a network, such as the Internet, can be established via the network connection unit 211. The network communication unit 210 supports wired LANs and wireless LANs. In a case where the network communication unit 210 supports a wired LAN, the network connection unit 211 is a connector for connecting a wired LAN cable. In a case where the network communication unit 210 supports a wireless LAN, the network connection unit 211 is an antenna. The flash memory 212 is a non-volatile memory for storing image data received by the network communication unit 210. The foregoing components are connected together via a bus 213.

According to the present exemplary embodiment, the CPU 205, the program memory 206, and the work memory 207 form a computer of the MFP 102. Each process described below as being performed by the MFP 102 is a process that is realized by the CPU 205 loading a program stored in the program memory 206 on the work memory 207 and executing the loaded program.

Further, unless otherwise specified, the MFP 108 has a configuration similar to the configuration of the MFP 102.

Figure 3:
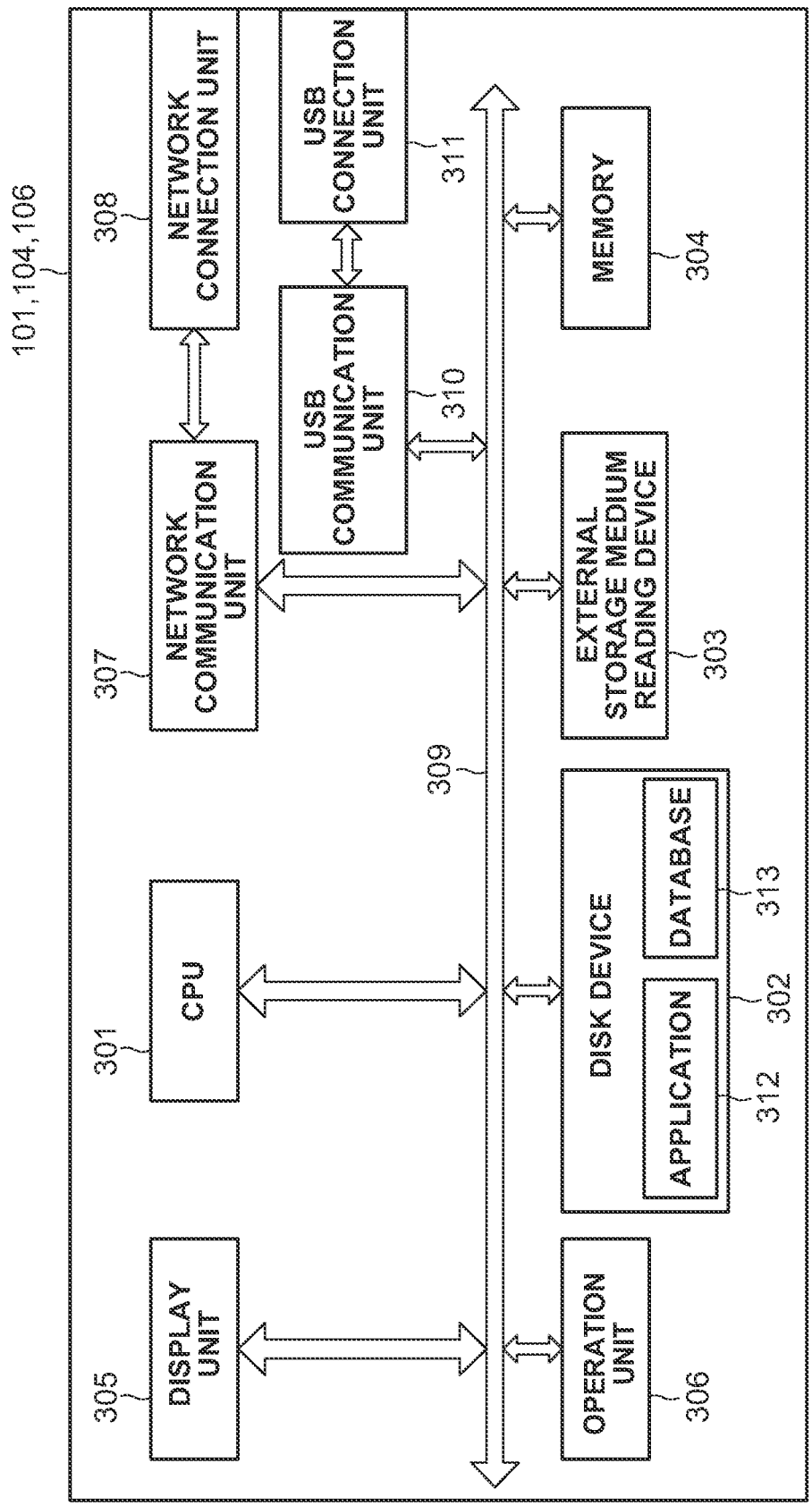
FIG. 3 is a block diagram illustrating a schematic configuration of an information processing apparatus.

FIG. 3 is a block diagram illustrating a schematic configuration of an information processing apparatus corresponding to the client apparatus 101, the relay server 104, and the service server 106.

A CPU 301 controls the following components. A disk device 302 stores an application 312, a database 313, an operating system (OS), and various files to be read by the CPU 301. An external storage medium reading device 303 is a device for reading information, such as a file, stored in a secure digital (SD) card serving as an external storage medium. A memory 304 includes a RAM, and the CPU 301 temporarily stores and buffers data as needed in the memory 304. A display unit 305 includes, for example, a LCD and displays various types of information. An operation unit 306 includes a keyboard and a mouse, and a user performs various input operations using the keyboard and the mouse. A network communication unit 307 is connected to a network, such as the Internet, via a network connection unit 308 and performs various types of communication. The network communication unit 307 supports wired LANs and wireless LANs. In a case where the network communication unit 307 supports a wired LAN, the network connection unit 308 is a connector for connecting a wired LAN cable. In a case where the network communication unit 307 supports a wireless LAN, the network connection unit 308 is an antenna. A universal serial bus (USB) communication unit 310 is connected to various peripheral devices via a USB connection unit 311 and performs various types of communication. The foregoing components are connected together via a bus 309. The client apparatus 101, the relay server 104, and the service server 106 can be a virtual computer realized on a computer.

Further, according to the present exemplary embodiment, the CPU 301, the disk device 302, and the memory 304 form a computer of the client apparatus 101, a computer of the relay server 104, or a computer of the service server 106. Further, each process described below as being performed by the client apparatus 101, the relay server 104, or the service server 106 is a process that is realized by the CPU 301 loading a program stored in the disk device 302 on the memory 304 and executing the loaded program.

<First Registration Process>

First, a first registration process of associating a first account with the MFP 102 will be described below. The first account is a user account of an owner of the MFP 102 and is managed by the relay server 104. The first account is an account for the first print service.

First, the first registration process is started in response to the MFP 102 receiving a user operation for a function of the first print service. In a case where the operation is received, the MFP 102 accesses the relay server 104 using pre-stored information for use in access to the relay server 104. Identification information about the MFP 102 and model type information about the MFP 102 are transmitted to the relay server 104 through the access. Then, in a case where the relay server 104 determines that a first account of the owner of the MFP 102 has not been generated and the MFP 102 is not associated with the first account, the relay server 104 generates the first account and transmits security information (identification (ID), password) managed in associated with the generated first account to the MFP 102. In this process, the relay server 104 manages the identification information about the MFP 102 and the model type information about the MFP 102 in association with the first account. In a case where the MFP 102 receives the security information, the MFP 102 stores the received security information in the program memory 206 and manages the first account. The first registration process is thus completed. After the first registration process is completed, the MFP 102 uses the stored security information when accessing the relay server 104. This enables the relay server 104 to recognize with which account the MFP 102 having accessed the relay server 104 is associated.

<Installation of Program for Second Print Service>

Next, a process of installing a program for the second print service (hereinafter, the program will be referred to as "second print service program") on the client apparatus 101 will be described below. According to the present exemplary embodiment, the second print service program is a printer driver for the second print service (hereinafter, the printer driver will be referred to as "second print service driver") and an application for the second print service (hereinafter, the application will be referred to as "second print service application").

First, the client apparatus 101 receives an operation for installation of the second print service program from a user via, for example, a web page for the second print service. Then, the client apparatus 101 downloads an installer for installing the second print service program from the service server 106. Then, the client apparatus 101 installs the second print service program on the client apparatus 101 using the installer. In response to the client apparatus 101 activating the second print service application, processing to associate the second print service application with a second account is performed. Specifically, the client apparatus 101 displays a screen for logging in to the second account on a screen displayed by the second print service application. The second account is a user account of the owner of the MFP 102 and is an account managed by the service server 106 for the second print service. The second account can be generated using any method. For example, an administrator can generate a plurality of accounts and can assign each generated account to a different user. In a case where an ID and a password of the second account are input via the screen by a user, the client apparatus 101 transmits the input information to the service server 106. In a case where the input information matches information about the second account that is managed by the service server 106, the service server 106 transmits a notification of successful login to the second account to the client apparatus 101. After the successful login to the second account, the client apparatus 101 can transmit print jobs to the service server 106.

<Second and Third Registration Processes>

Next, a second registration process of associating the first account with the second account will be described below. Further, a third registration process of associating the second account with the MFP 102 will be described below.

The second and third registration processes are performed in a state where the first account is associated with the MFP 102 as a result of the first registration process. The second and third registration processes are performed in a state where the client apparatus 101 is successfully logged in to the second account.

Figure 4:
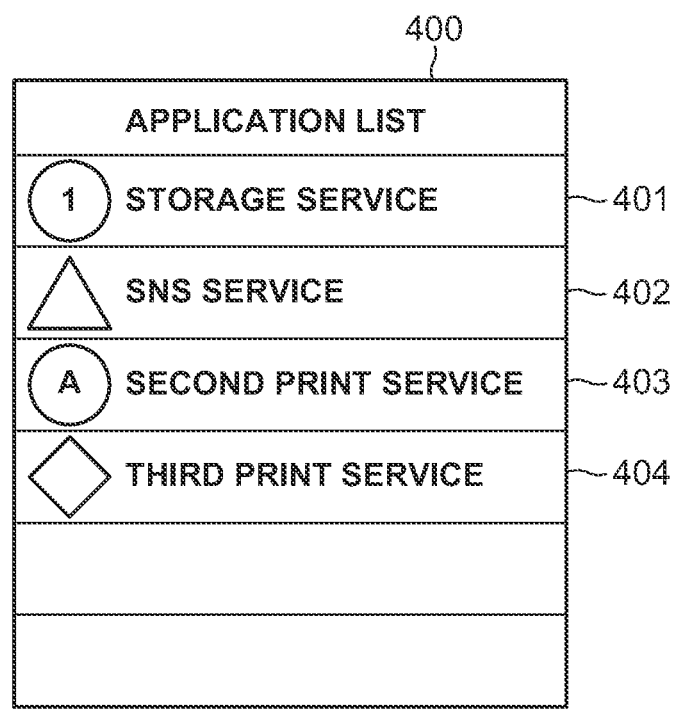
FIG. 4 is a diagram illustrating an example of a service selection screen.

In a case where the first registration process is completed or in a case where an operation for performing the function of the first print service is received in a state where the first registration process is completed, the MFP 102 receives information for displaying of a service selection screen 400 illustrated in FIG. 4 from the relay server 104 and displays the service selection screen 400. The service selection screen 400 is a screen on which the user selects a service to be used to acquire (receive) a content to be printed using the first print service, and the service selection screen 400 is a screen that displays a list of selectable services. According to the present exemplary embodiment, the selectable services include, but are not limited to, the online storage service, the social networking service, the second print service, and a third print service, and the types and number of services can be determined as desired. According to the present exemplary embodiment, the third print service is a service for printing of content transmitted from the relay server 104 and is a service for printing of number place puzzles. Print targets are not limited to the puzzles and can be, for example, coloring books, graph paper, or music paper. The service selection screen 400 includes areas 401 to 404 each for selection of a corresponding service.

Then, the MFP 102 receives a selection operation performed on the area 403 for the second print service from a user and notifies the relay server 104 that the second print service is selected. Then, in a case where the relay server 104 determines that the second registration process is not completed, the relay server 104 transmits information for displaying a registration key input screen to the MFP 102, and the MFP 102 displays the registration key input screen. The registration key input screen receives input of a registration key from a user. The registration key is a random 16-digit numerical value and is issued and generated in association with the second account by the service server 106. Further, the registration key is a key that is displayed on the client apparatus 101 by the second print service application installed on the client apparatus 101. The registration key can be displayed on, for example, a screen that is displayed by the web browser of the client apparatus 101 and corresponds to the print service provided by the service server 106. A user checks the registration key displayed on the client apparatus 101 and inputs the displayed registration key to the registration key input screen. In a case where the MFP 102 receives the registration key input, the relay server 104 transmits the input registration key to a registration key confirmation server (not illustrated). In a case where the registration key confirmation server determines that the registration key input by the user matches the registration key issued by the service server 106, the registration key confirmation server transmits communication information for use in communication with the service server 106 to the relay server 104. Alternatively, the input registration key can be transmitted to the service server 106, and the service server 106 can determine whether the input registration key matches the registration key issued by the service server 106. The relay server 104 transmits information about a printer (i.e., the MFP 102 herein) associated with the first account, the ID associated with the first account, and a notification uniform resource locator (notification URL) for a notification about a print job to the relay server 104 to the service server 106 using the received communication information.

Then, the service server 106 manages the ID associated with the first account in association with the second account, to associate the first account with the second account. The ID associated with the first account is used to transmit a notification about a print job for push printing from the service server 106 to the relay server 104. Further, the service server 106 manages the information about the MFP 102 associated with the first account in association with the second account, to associate the second account with the MFP 102. The second and third registration processes are thus completed. Then, the service server 106 transmits an access token for access to a content managed in association with the second account to the relay server 104. The relay server 104 acquires the content managed by the service server 106 using the received access token.

<Push Printing and Pull Printing>

Next, a process of causing the MFP 102 to perform printing based on an instruction from the client apparatus 101 using the second print service will be described below. The process is performed in a state where the first to third registration processes are completed and the various types of association are completed. The process includes a process of causing the MFP 102 to perform push printing and a process of causing the MFP 102 to perform pull printing. First, a process that is performed by the client apparatus 101 to cause the MFP 102 to perform printing will be described below.

First, the client apparatus 101 identifies a print target content in a document application, a spreadsheet application, an image editing application, a presentation application, or the like, and receives selection of a printer driver to be used in printing the content from a user. Then, after the second print service driver is selected by the user, the client apparatus 101 receives input of a print setting for printing of the print target content from the user. The print setting can be received via a screen of the document application, the spreadsheet application, the image editing application, or the presentation application, or the second print service driver can be activated to receive the print setting via a screen of the second print service driver. Further, according to the present exemplary embodiment, items in the print setting that is input by a user include, for example, an item for selection of a print sheet size, an item for selection of a print sheet type, an item for selection between color printing and monochrome printing, an item for selection between two-sided printing and one-sided printing, an item for selection between border printing and borderless printing, and an item for selection of a layout.

Figure 5:
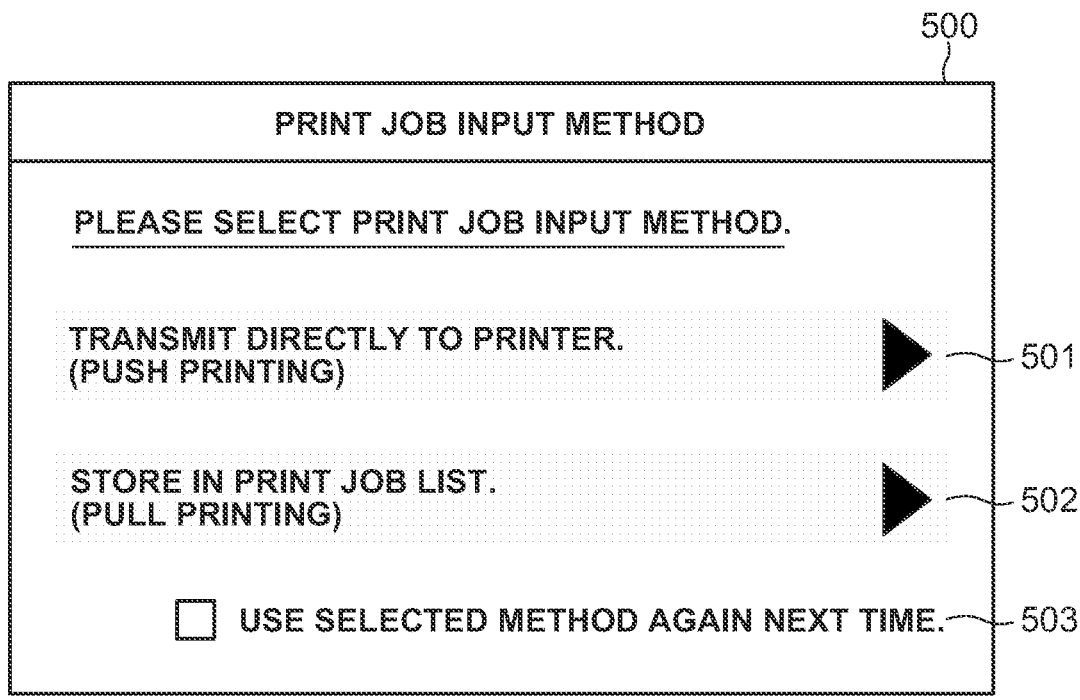
FIG. 5 is a diagram illustrating an example of a print selection screen.

Then, in a case where a print instruction operation is received from the user, the client apparatus 101 converts the print target content into data in a predetermined data format and then activates the second print service application from the second print service driver. The predetermined data format is, for example, portable document format (PDF). FIG. 5 illustrates an example of a screen that is displayed in this process by the second print service application. A print selection screen 500 is a screen on which the user selects whether to transmit (input) a print job for causing the MFP 102 to perform push printing or to transmit a print job for causing the MFP 102 to perform pull printing. An option 501 is an area for transmission of a print job causing the MFP 102 to perform push printing. An option 502 is an area for transmission of a print job causing the MFP 102 to perform pull printing. According to the present exemplary embodiment, the first print service is supported by the MFP 102 but is not supported by the MFP 108. Further, according to the present exemplary embodiment, an instruction to perform push printing by the second print service is transmitted to the printer via the first print service. Thus, push printing based on a print job transmitted by the second print service can be performed by the MFP 102 but cannot be performed by the MFP 108. In other words, only a single printer can be identified as a printer that is to be caused to perform push printing. Thus, the option 501 can display identification information (name, model number) about the printer that is to be caused to perform push printing. The printer that is to be caused to perform push printing is a printer (the MFP 102 herein) associated with the first and second accounts. Meanwhile, the second print service is supported not only by the MFP 102 but also by the MFP 108. Further, pull printing by the second print service can be performed by any printers that support at least the second print service according to the present exemplary embodiment. Thus, pull printing based on a print job transmitted by the second print service can be performed either one of the MFPs 102 and 108. Specifically, a printer that is to be caused to perform pull printing is not necessarily a single printer, and thus, according to the present exemplary embodiment, the option 502 does not display identification information about the printer that is caused to perform pull printing. The pull printing can be referred to as another name such as secure printing.

In a case where the option 501 or 502 is selected, the client apparatus 101 transmits a print job for one of the push printing and the pull printing that corresponds to the selected option to the service server 106. According to the present exemplary embodiment, a print job for push printing and a print job for pull printing each include content converted into the predetermined data format, the print setting for use in printing the content, and information about the second account to which the client apparatus 101 is logged in. In a case where the option 501 or 502 is selected with a check put in a checkbox 503, in response to a next print instruction operation from a user, the client apparatus 101 performs printing corresponding to the previously-selected one of the options 501 and 502 without displaying the print selection screen 500. A period during which the print selection screen 500 is not displayed even if the client apparatus 101 receives a print instruction operation from a user can be selectable by the user.

Push printing is highly-convenient printing because the user simply performs an operation for printing on the client apparatus 101 to cause the MFP 102 to perform the printing. However, it sometimes takes time for the user to check a printed matter output by push printing after the user performs an operation for printing on the client apparatus 101 due to, for example, a great distance between the client apparatus 101 and the MFP 102. In such a case, a security issue may arise, e.g., the printed matter is seen by another user. Pull printing, on the other hand, is performed by a user operation for printing on the client apparatus 101 and then a user operation for printing on the MFP 102. Pull printing is less convenient than push printing but is more secure than push printing because the user can promptly check a printed matter output by pull printing. According to the present exemplary embodiment, since push printing and pull printing are selectable, a user can select suitable printing for each purpose of use.

<Sequence in Push Printing>

Figure 6:
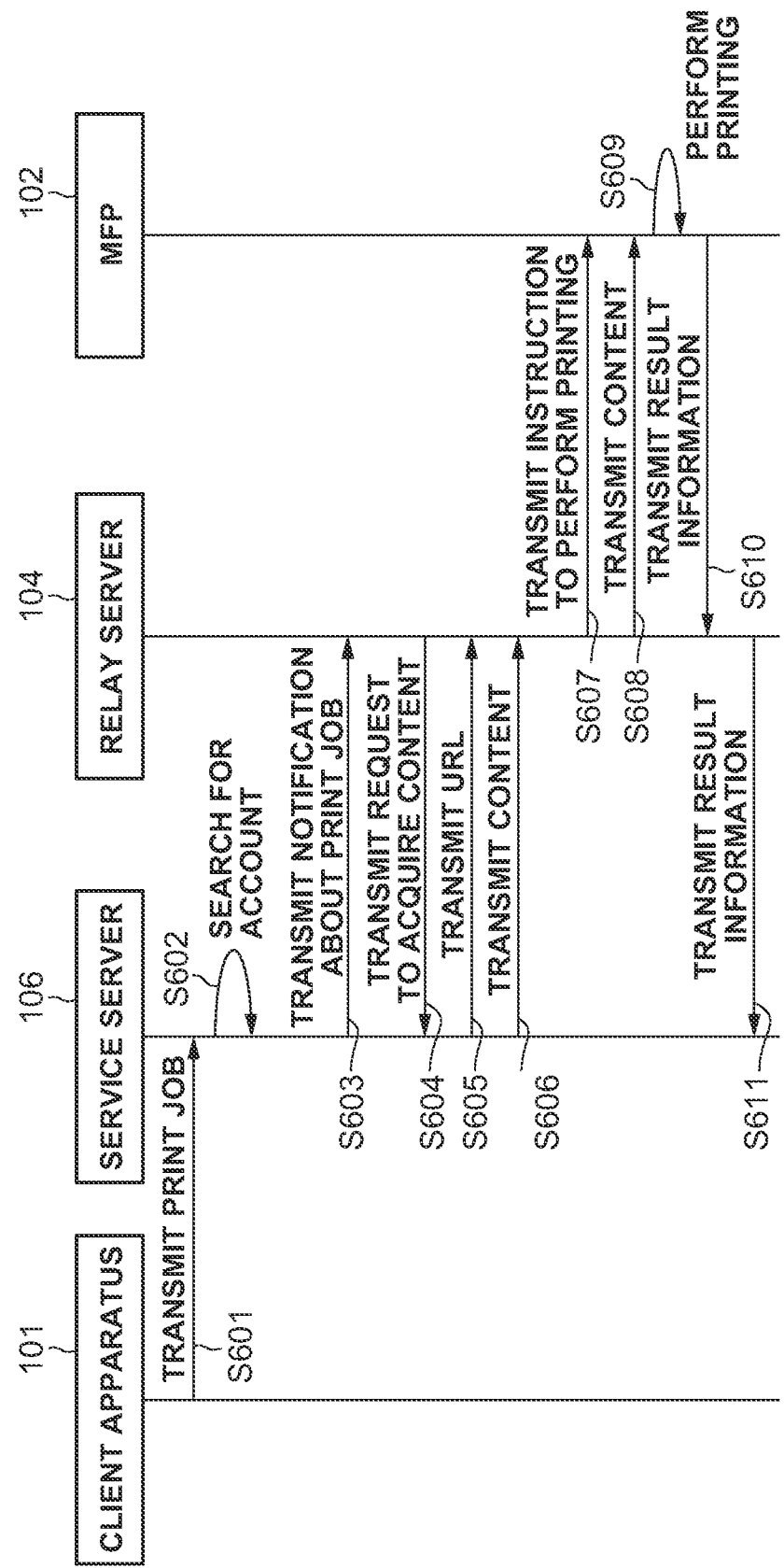
FIG. 6 is a sequence diagram illustrating a process for push printing.

First, a process for causing the MFP 102 to perform push printing will be described below with reference to a sequence diagram illustrated in FIG. 6. The process in the sequence diagram is started in a case where the option 501 is selected.

First, in step S601, the client apparatus 101 transmits a print job for push printing to the service server 106.

Next, in step S602, the service server 106 performs processing based on the print job for push printing. Specifically, the service server 106 searches an account group managed by the service server 106 and identifies, based on information about the second account included in the received print job, the second account to which the client apparatus 101 is logged in. Then, the service server 106 identifies the first account that is associated with the identified second account.

Next, in step S603, the service server 106 transmits the job number assigned to the print job received in step S601 to the relay server 104 using the notification URL, to notify the relay server 104 of the receipt of the print job. Further, the service server 106 also transmits the ID corresponding to the first account identified in step S602 and the print setting included in the print job received in step S601 to the relay server 104.

Next, in step S604, the relay server 104 transmits a request to acquire a content (content included in the print job) to be printed by the print job corresponding to the job number received in step S603 to the service server 106 using the access token corresponding to the second account.

In step S605, the service server 106 transmits a URL of a first area where the content to be printed by the print job is stored to the relay server 104.

In step S606, the relay server 104 accesses the first area using the received URL and acquires the content to be printed by the print job from the first area. The first area is an area in the service server 106, and the service server 106 transmits the content to the relay server 104, but aspects of the present disclosure are not limited to the foregoing form. The content to be printed by the print job can be stored in an area in a server that is not the service server 106, and a URL of the server can be transmitted in step S605.

In step S607, the relay server 104 stores the acquired content in a second area, and then, the relay server 104 transmits a URL of the second area and the print setting for use in printing the acquired content as an instruction to perform printing to the MFP 102. In step S607, the relay server 104 can transmit the content directly to the MFP 102.

In step S608, the MFP 102 having received the URL accesses the second area using the received URL and acquires, from the second area, the content to be printed by the print job transmitted from the client apparatus 101. The second area is an area in the relay server 104, and the relay server 104 transmits the content to the MFP 102, but aspects of the present disclosure are not limited to the foregoing configuration. The content to be printed by the print job can be stored in an area in a server that is not the relay server 104, and a URL of the server can be transmitted in step S607.

In step S609, the MFP 102 prints the content acquired in step S608 using the print setting received in step S607.

In step S610, the MFP 102 transmits result information about a result of the printing performed in step S609 to the relay server 104. The result information includes information about, for example, the total number of pages printed by the printing, the number of pages printed in color among the total number of pages, the number of pages printed in monochrome among the total number of pages, and the number of pages printed on both sides among the total number of pages. Further, the result information includes information about, for example, a job name of the print job corresponding to the printing and the execution time of the printing. According to the present exemplary embodiment, because the term "one page" refers a print area corresponding to one side of a sheet, in a case where, for example, two-sided printing is performed, it is determined that two pages are printed on one sheet. Aspects of the present disclosure are not limited to the foregoing configuration, and the result information can include information about, for example, the amounts of recording materials consumed (used) in the printing and the number of sheets consumed (used) in the printing. Further, the result information can include, for example, size information about sheets used in the printing and information about the number of pages printed by layout printing among the total number of pages.

In step S611, the relay server 104 transmits the result information received in step S610 to the service server 106. The service server 106 having received the result information manages the received result information in association with the second account. Specifically, the service server 106 manages information about printing performed based on an instruction from the second account. This enables the user of the second account and an administrator managing a plurality of accounts including the second account to view the information about printing performed based on an instruction from the second account.

<Sequence in Pull Printing>

Figure 7:
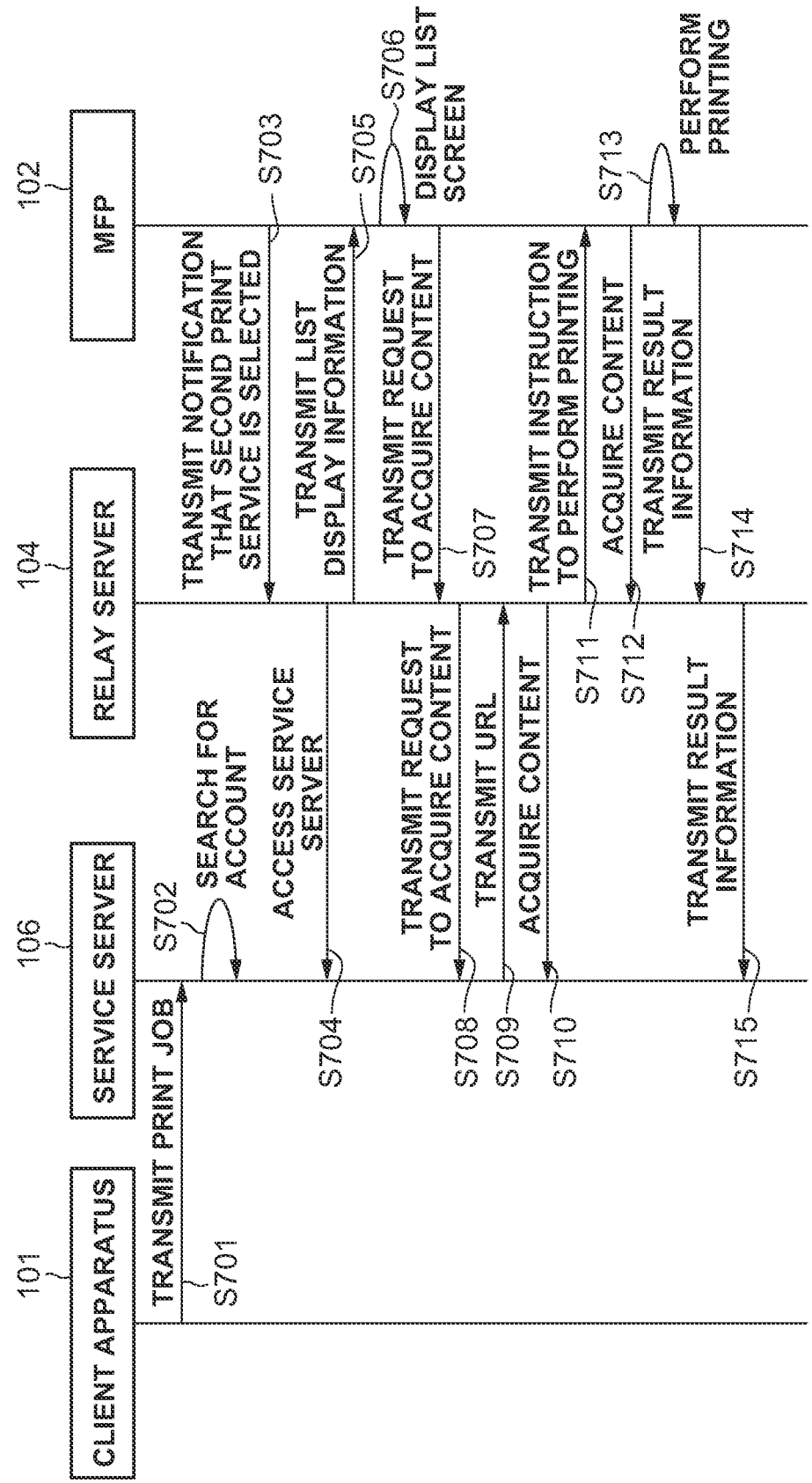
FIG. 7 is a sequence diagram illustrating a process for pull printing.

Next, a process for causing the MFP 102 to perform pull printing will be described below with reference to a sequence diagram illustrated in FIG. 7. The process in the sequence diagram is started in response to the option 502 being selected.

First, in step S701, the client apparatus 101 transmits a print job for pull printing to the service server 106.

Next, in step S702, the service server 106 performs processing based on the print job for pull printing. Specifically, the service server 106 searches the account group managed by the service server 106 and identifies the second account to which the client apparatus 101 is logged in, based on the information about the second account included in the received print job. Then, the service server 106 stores and manages the received print job in association with the identified second account. A plurality of print jobs can be stored and managed in association with the second account by repeating steps S701 and S702. Then, the service server 106 waits for access from the relay server 104 or the MFP 108.

Next, in step S703, the MFP 102 receives a user operation performed on the area 403 for the second print service and notifies the relay server 104 that the second print service is selected.

In step S704, since the second registration process has been completed, the relay server 104 accesses the service server 106 using the access token corresponding to the second account. Then, the relay server 104 acquires list information about a print job list managed and stored in association with the second account. The list information includes job name information about a single print job or a plurality of print jobs managed and stored in association with the second account and information about date and time of receipt of the single print job or each of the plurality of print jobs by the service server 106. Further, the list information includes print setting information about the single print job or each of the plurality of print jobs.

Next, in step S705, the relay server 104 generates information (list display information) for displaying of a list screen 800 illustrated in FIG. 8, based on the acquired list information and transmits the generated information to the MFP 102.

Next, in step S706, the MFP 102 displays the list screen 800 based on the information received in step S705. The list screen 800 includes, for example, an area 801 for the job name of the single print job or each of the plurality of print jobs managed and stored in association with the second account and an area 802 for displaying the date and time of receipt of the single print job or each of the plurality of print jobs by the service server 106. In the example illustrated in FIG. 8, information about print jobs 803 to 805 is displayed as the single print job or the plurality of print jobs managed and stored in association with the second account. Information to be displayed on the list screen 800 is not limited to those described above, and other types of information about the single print job or each of the plurality of print jobs managed and stored in association with the second account can be displayed. Specifically, for example, information about the number of pages of a content to be printed by the single print job or each of the plurality of print jobs managed and stored in association with the second account and information about a print setting included in the single print job or each of the plurality of print jobs managed and stored in association with the second account can be displayed. A delete button 806 is a button for deletion of a job selected by the user from among the single print job or the plurality of print jobs managed and stored in association with the second account. In a case where the delete button 806 is operated, an instruction to delete the selected print job is transmitted to the service server 106 via the relay server 104. The print job for which the delete instruction is issued is thus deleted from the print jobs managed by the service server 106.

Figure 9:
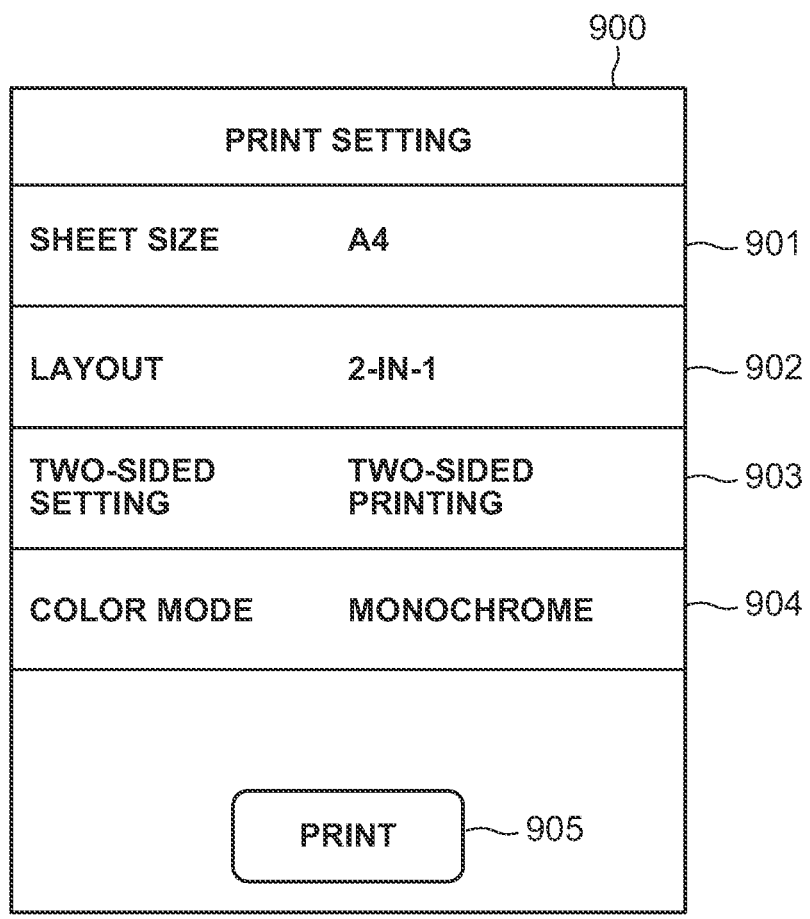
FIG. 9 is a diagram illustrating an example of a setting display screen.

According to the present exemplary embodiment, in a case where one of the print jobs displayed on the list screen 800 is selected, the MFP 102 notifies the selected print job to the relay server 104. Then, the relay server 104 transmits information (setting display information) for displaying of a setting display screen 900 for the print setting included in the selected print job as illustrated in FIG. 9 to the MFP 102. Then, the MFP 102 displays the setting display screen 900 based on the received information. According to the present exemplary embodiment, the setting display screen 900 displays a sheet size 901, a layout 902, a two-sided setting 903, and a color mode 904, as areas indicating setting details of items. The sheet size 901 indicates the setting detail of an item for a print sheet size. The layout 902 indicates the setting detail of an item for selection of a layout. The two-sided setting 903 indicates the setting detail of an item for selection between two-sided printing and one-sided printing. The color mode 904 indicates the setting detail of an item for selection between color printing and monochrome printing. Aspects of the present disclosure are not limited to the foregoing configuration, and an area indicating a setting detail of another item included in the print setting can also be included. According to the present exemplary embodiment, the MFP 102 can change a set setting detail of an item by receiving a user operation performed on the item. Each setting detail selectable by the user for a change corresponds to the model type information about the MFP 102 and does not cause a first conflict described below.

Specifically, in a case where the MFP 102 receives a user operation performed on an item, the MFP 102 transmits a request to change the print setting to the relay server 104. The print setting managed by the relay server 104 is thus changed, and information for displaying of the setting display screen 900 indicating the setting details of the changed print setting is transmitted to the MFP 102, whereby the MFP 102 displays the setting display screen 900 based on the transmitted information. A print button 905 is a start button for printing, on the MFP 102, based on the print job selected on the list screen 800 using the print setting displayed on the setting display screen 900.

The client apparatus 101 can receive information for displaying the list screen 800 from the service server 106 to display the list screen 800 also on the second print service application. Further, an instruction to delete a print job and an instruction to change the print setting can be issued from the client apparatus 101 to the service server 106 via the second print service application. The list screen 800 displayed on the MFP 102 can be simpler in content than that illustrated in FIG. 8. For example, the area 802 can be excluded from the list screen 800 displayed on the MFP 102. Further, for example, the delete button 806 can be excluded from the list screen 800 displayed on the MFP 102 so that an instruction to delete a print job cannot be performed from the MFP 102.

In step S707, the MFP 102 receives a user's pressing operation performed on the print button 905. Then, the MFP 102 transmits a request to acquire the content to the relay server 104. The request includes information about which one of the print jobs is selected on the list screen 800 and information indicating the setting details of the print setting displayed on the setting display screen 900.

Next, in step S708, the relay server 104 transmits a request, by using the access token corresponding to the second account, to acquire the content (content included in the print job) to be printed by the print job selected on the list screen 800 to the service server 106.

In step S709, the service server 106 transmits the URL of the first area storing the content to be printed by the print job to the relay server 104.

In step S710, the relay server 104 accesses the first area using the received URL and acquires the content to be printed by the print job from the first area.

In step S711, the relay server 104 stores the acquired content in the second area and then transmits, to the MFP 102, the URL of the second area and the print setting for use in printing the acquired content as an instruction to perform printing. In step S711, the relay server 104 can transmit the content directly to the MFP 102.

In step S712, the MFP 102 having received the URL accesses the second area using the URL and acquires, from the second area, the content to be printed by the print job selected on the list screen 800.

In step S713, the MFP 102 prints the content acquired in step S712 using the print setting received in step S711.

In step S714, the MFP 102 transmits result information about a result of the printing performed in step S713 to the relay server 104.

In step S715, the relay server 104 transmits the result information received in step S714 to the service server 106. The service server 106 having received the result information manages the received result information in association with the second account. Specifically, the service server 106 manages the information about printing performed based on an instruction from the second account.

As described above, push printing is performed by the MFP 102 based on the print setting that is input by a user operation performed on the client apparatus 101. However, there may be a case where, for example, the print setting input by a user operation performed on the client apparatus 101 does not correspond to capability of the MFP 102 and the MFP 102 cannot perform printing based on the print setting input by the user operation performed on the client apparatus 101. This issue occurs due to the following reasons. Specifically, according to the present exemplary embodiment, the application and the second print service driver that receive the print setting from the user do not acquire the capability information about the printer that is to perform printing. Furthermore, a control process for configuring the print setting based on the capability information is not performed.

Thus, according to the present exemplary embodiment, in a case where the MFP 102 cannot perform printing based on a print job transmitted from the client apparatus 101 to the second print service, the relay server 104 performs a process for enabling the MFP 102 to perform printing based on the print job. The relay server 104 operates as a control apparatus according to an aspect of the present disclosure. In push printing, printing is performed by the MFP 102 without a user operation on the client apparatus 101 or the MFP 102 after a print job for push printing is transmitted from the client apparatus 101. Thus, there is no timing for the user to change the print setting for printing based on the print job for push printing after the print job is transmitted from the client apparatus 101. Thus, according to the present exemplary embodiment, specifically, in a case where push printing is selected on the second print service application as printing based on a print job transmitted from the client apparatus 101 to the second print service and the model type information about the MFP 102 does not correspond to the print setting for the printing, the print setting is changed by the relay server 104 to a print setting corresponding to the model type information about the MFP 102.

In pull printing, on the other hand, printing is performed by the MFP 102 when a user operation is performed on the MFP 102 after a print job for pull printing is transmitted from the client apparatus 101. Thus, the printing is not to be performed immediately after the print job for pull printing is transmitted from the client apparatus 101, and thus, there is a timing for the user to change the print setting for the printing based on the print job. Push printing is performed only by the MFP 102 associated with the first account or the second account, whereas pull printing can be performed by any printers associated with the second account. Consequently, in a case of the configuration in which the relay server 104 automatically changes, based on the model type information about the MFP 102, the print setting for pull printing that is managed by the service server 106, even if the change is performed, pull printing may be performed by another printer. Thus, in a case where pull printing is selected on the second print service application as printing based on a print job transmitted from the client apparatus 101 to the second print service and the print setting for the printing does not correspond to the model type information about the MFP 102, the relay server 104 performs control to display, on the MFP 102, a screen indicating that the print setting for the printing do not correspond to the model type information about the MFP 102. Then, in a case where an operation to change the print setting is performed on the MFP 102 after the screen is displayed on the MFP 102, the print setting is changed by the relay server 104.

<Process Performed by Relay Server in Push Printing>

Figure 10:
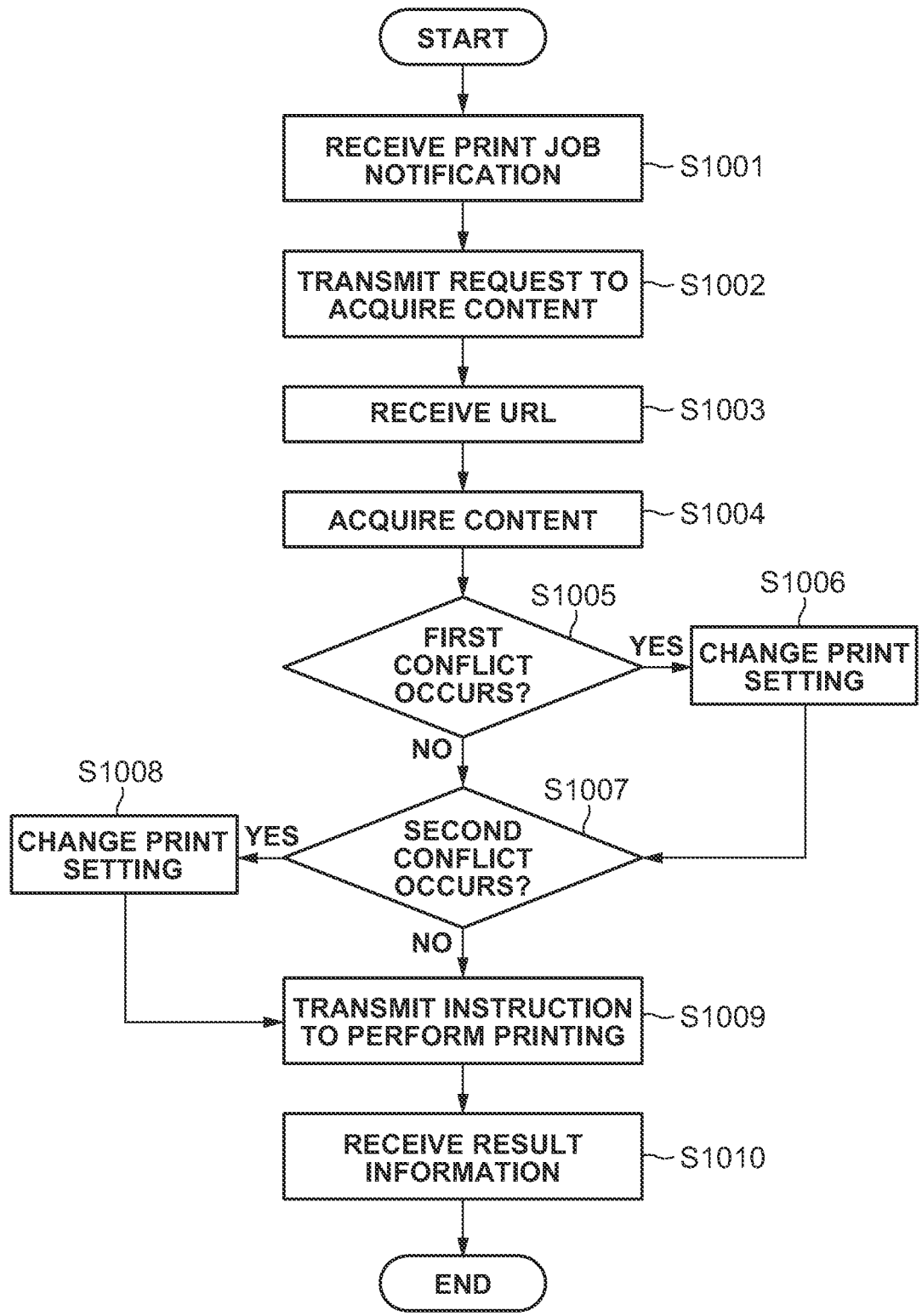
FIG. 10 is a flowchart illustrating a process performed by a relay server during a process for push printing.

A process that is performed by the relay server 104 in the process for causing the MFP 102 to perform push printing will be described below with reference to a flowchart illustrated in FIG. 10.

In step S1001, the relay server 104 receives a notification of the receipt of the print job from the service server 106. Specifically, the relay server 104 receives the job number assigned to the print job for push printing received by the service server 106. Further, in this process, the print setting (hereinafter, the print setting will be referred to as "print setting for push printing") that are input to the client apparatus 101 by the user and are included in the print job for push printing received by the service server 106 are also acquired from the service server 106. The processing corresponds to the processing performed by the relay server 104 in step S603.

In step S1002, the relay server 104 transmits a request to acquire the content (content included in the print job) to be printed by the print job corresponding to the job number received in step S1001 to the service server 106 using the access token corresponding to the second account. The processing corresponds to the processing performed by the relay server 104 in step S604.

In step S1003, the relay server 104 receives the URL of the first area storing the content to be printed by the print job from the service server 106. The processing corresponds to the processing performed by the relay server 104 in step S605.

In step S1004, the relay server 104 accesses the first area using the received URL and acquires the content to be printed by the print job from the first area. Then, the relay server 104 stores the acquired content in the second area. The processing corresponds to the processing performed by the relay server 104 in step S606.

In step S1005, the relay server 104 determines whether the first conflict occurs with the print setting for push printing that is acquired in step S1004, based on the model type information about the MFP 102. The first conflict refers to a situation where at least one setting detail of the item in the print setting does not correspond to the model type information about the MFP 102. In other words, the first conflict refers to a situation where at least one setting detail of the item in the print setting fails to satisfy a condition that each setting detail corresponds to the model type information about the MFP 102. Specifically, in a case where, for example, the setting detail of the item for selection between two-sided printing and one-sided printing in the print setting for push printing indicates two-sided printing and the model type information about the MFP 102 does not correspond to the two-sided printing (the MFP 102 is of a model type that cannot perform two-sided printing), it is determined that the first conflict occurs. However, some model types can perform two-sided printing. Thus, the first conflict may or may not occur with the setting detail of the print setting depending on the model type information about the MFP 102. In other words, whether the first conflict occurs is determined based on not only the setting detail of the print setting for push printing but also the model type information about the MFP 102. In a case where the relay server 104 determines that the first conflict occurs (YES in step S1005), the processing proceeds to step S1006. In a case where the relay server 104 determines that the first conflict does not occur (NO in step S1005), the processing proceeds to step S1007.

In step S1006, the relay server 104 changes the setting detail for push printing, based on the model type information about the MFP 102, to resolve the first conflict. The setting detail to be changed herein is the setting detail stored in the relay server 104. Specifically, the relay server 104 changes the setting detail, of the plurality of items in the print setting for push printing, not corresponding to the model type information about the MFP 102 to a setting detail corresponding to the model type information about the MFP 102. Specifically, for example, in a case where the setting detail of the item for selection between two-sided printing and one-sided printing in the print setting for push printing indicates two-sided printing, but the model type information about the MFP 102 does not correspond to two-sided printing, the setting detail of the item for selection between two-sided printing and one-sided printing is changed to a setting detail indicating one-sided printing. Further, specifically, for example, in a case where the setting detail of the item for selection between color printing and monochrome printing in the print setting for push printing indicates color printing, but the model type information about the MFP 102 does not correspond to color printing, the setting detail of the item for selection between color printing and monochrome printing is changed to a setting detail indicating monochrome printing. In a case where the first conflict occurs with a plurality of setting details, the relay server 104 changes the plurality of setting details in the processing. The relay server 104 performs the determination of how to change the setting detail, by using a table based on the model type information about the MFP 102. The table defines a correspondence between each change target setting detail of the items in the print setting for push printing and a setting detail to which the change target setting detail is to be changed. Further, the content of the table varies depending on the model type information corresponding to the table. Then, the processing proceeds to step S1007.

In step S1007, the relay server 104 determines whether a second conflict occurs with the print setting for push printing, based on the model type information about the MFP 102. In a case where the processing of step S1006 has been performed, the determination is performed with respect to the changed print setting for push printing. The second conflict refers to a situation where a combination of a setting detail of at least one item in the print setting and another setting detail of at least one other item in the print setting does not correspond to the model type information about the MFP 102. In other words, the second conflict refers to a situation where a setting detail of at least one item in the print setting does not satisfy the condition that every setting detail is included in the combination corresponding to the model type information about the MFP 102. Specifically, in a case where, for example, the setting detail of the item for selection between two-sided printing and one-sided printing in the print setting for push printing indicates two-sided printing, the setting detail of the item for selection of print sheet size indicates B5, and the combination of the setting details of the two items does not correspond to the model type information about the MFP 102 (the MFP 102 is of a model type that cannot perform two-sided printing using B5-size sheets), it is determined that the second conflict occurs. However, some model types of the MFP 102 can perform two-sided printing using B5-size sheets. Thus, the second conflict may or may not occur with the setting details of the print setting depending on the model type information about the MFP 102. In other words, determination of whether the second conflict occurs is made based on not only the setting details of the print setting for push printing but also the model type information about the MFP 102. There may be a combination with which the second conflict occurs regardless of the model type of the MFP 102. For example, it can be determined that the second conflict occurs regardless of the model type of the MFP 102, in a case where the setting detail of the item for selection between color printing and monochrome printing in the print setting for push printing indicates color printing and the setting detail of the item for selection of a print sheet type indicates glossy paper. In a case where the relay server 104 determines that the second conflict occurs with the print settings for push printing (YES in step S1007), the processing proceeds to step S1008. In a case where the relay server 104 determines that the second conflict does not occur with the print settings for push printing (NO in step S1007), the processing proceeds to step S1009.

Figure 11:
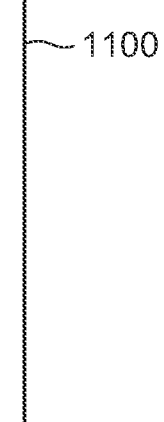
FIG. 11 is a diagram illustrating an example of a priority table.

In step S1008, the relay server 104 changes the setting detail of the print setting for push printing, to resolve the second conflict. The setting detail to be changed herein is the setting detail of the print setting stored in the relay server 104. Specifically, the relay server 104 changes at least one of the setting details, included in the combination, not corresponding to the model type information about the MFP 102 to a setting detail corresponding to the model type information about the MFP 102. According to the present exemplary embodiment, one of the setting details included in the combination that does not correspond to the model type information about the MFP 102 is changed while the other is not changed. Which one of the setting details is to be changed is determined based on a priority table 1100 illustrated in FIG. 11. The priority table 1100 defines priorities of the items. Then, a setting detail of an item that is lower in priority defined in the priority table 1100 than the other setting detail included in the combination that does not correspond to the model type information about the MFP 102 is changed preferentially. The selection to which of setting details is set instead of the setting detail of the item with the lower priority is defined in another table based on the model type information about the MFP 102 and is determined based on the table. Specifically, for example, in a case where the setting detail of the item for selection between two-sided printing and one-sided printing in the print setting for push printing indicates two-sided printing, the setting detail of the item for selection of a print sheet size indicates B5, and the combination of the setting details of the two items does not correspond to the model type information about the MFP 102, the setting detail of the item for selection between two-sided printing and one-sided printing is changed to the setting detail indicating one-sided printing. The relay server 104 determines how to change the setting detail, using the table based on the model type information about the MFP 102. The table defines a correspondence between each change target setting detail of the items in the print setting for push printing and a setting detail to which the change target setting detail is to be changed. Further, the content of the table varies depending on the model type information corresponding to the table. Then, the processing proceeds to step S1009.

For example, control is performed such that the setting detail changed by the change processing in step S1006 is a setting detail not included in the combination with which the second conflict occurs. A specific example of the setting detail not included in the combination with which the second conflict occurs is a detail with which the second conflict does not occur regardless of the setting details of the other items. Further, control is performed such that the setting detail changed by the change processing in step S1008 is a setting detail with which the first conflict does not occur. The setting detail with which the first conflict does not occur refers to a setting detail corresponding to the model type information about the MFP 102.

In step S1009, the relay server 104 transmits, to the MFP 102, the URL of the second area and the print setting for use in printing the content as an instruction to perform printing. In a case where the print setting is changed in step S1006 and/or step S1008, the changed print setting is transmitted in step S1009. The processing corresponds to the processing performed by the relay server 104 in step S607.

In step S1009, the relay server 104 receives access from the MFP 102 and transmits the print target content. The processing corresponds to the processing performed by the relay server 104 in step S608.

In step S1010, the relay server 104 receives the result information from the MFP 102 and transmits the received result information to the service server 106. The processing corresponds to the processing performed by the relay server 104 in steps S610 and S611. Then, the process in the flowchart is ended.

With the above-described configuration, the MFP 102 performs push printing even in a case where an instruction to perform the push printing is issued via the second print service and the print setting input to the client apparatus 101 by a user do not correspond to the model type information about the MFP 102.

<Process Performed by Relay Server in Pull Printing>

Figure 12:
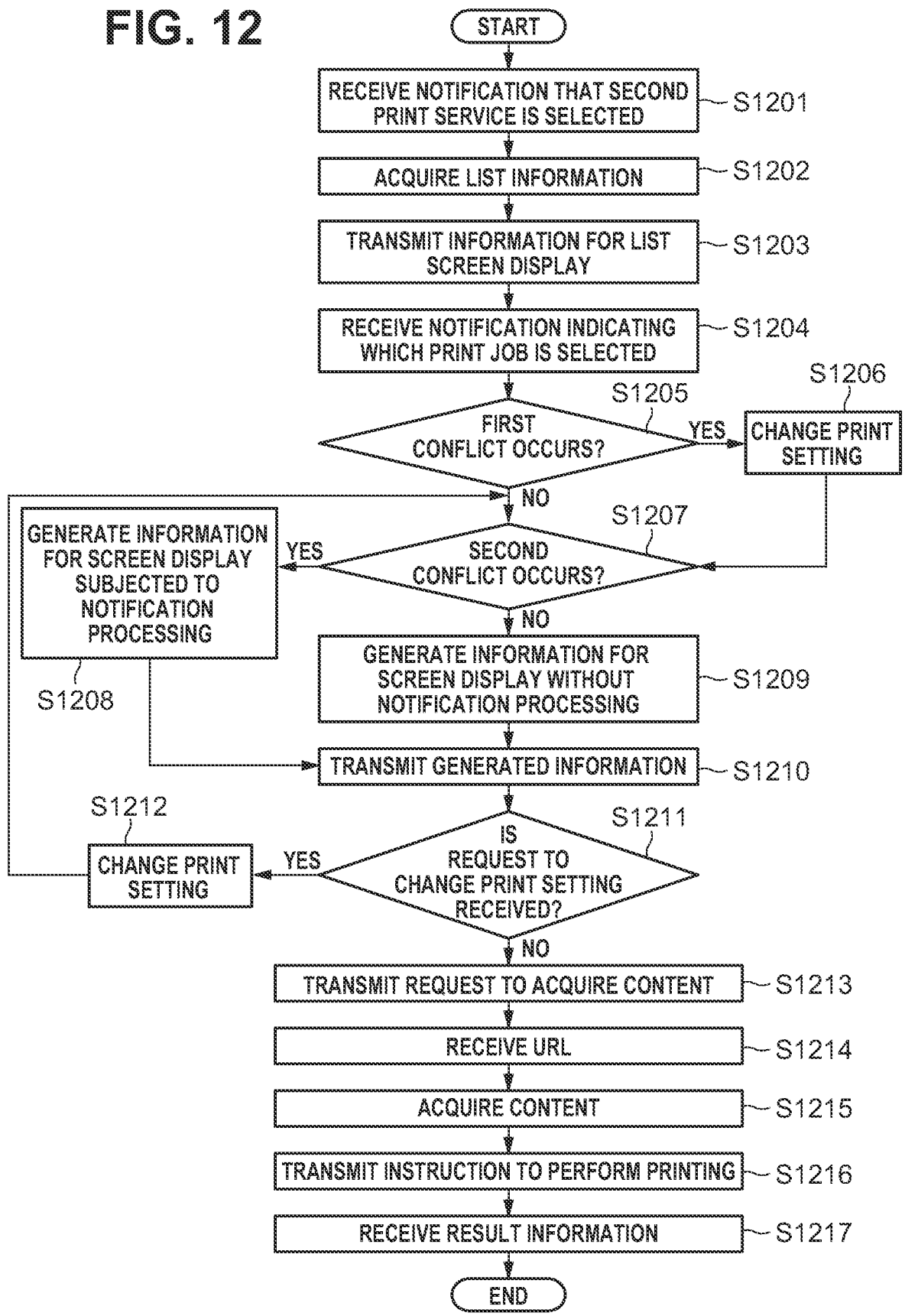
FIG. 12 is a flowchart illustrating a process performed by a relay server during a process for pull printing.

A process performed by the relay server 104 in the process for causing the MFP 102 to perform pull printing will be described below with reference to a flowchart illustrated in FIG. 12.

In step S1201, the relay server 104 receives, from the MFP 102, the notification that the second print service is selected. The processing corresponds to the processing performed by the relay server 104 in step S703.

In step S1202, the relay server 104 accesses the service server 106 using the access token corresponding to the second account. Then, the relay server 104 acquires the list information about the print job list managed and stored in association with the second account. The processing corresponds to the processing performed by the relay server 104 in step S704.

In step S1203, the relay server 104 generates information for displaying of the list screen 800, based on the acquired list information and transmits the generated information to the MFP 102.

In step S1204, the relay server 104 receives a notification indicating which print job is selected on the list screen 800 from the MFP 102. Then, the relay server 104 identifies the print setting (print setting for pull printing) included in the selected print job.

In step S1205, the relay server 104 determines whether the first conflict occurs with the print setting for pull printing that are identified in step S1204, based on the model type information about the MFP 102. The determination is performed as in step S1005, except that the determination target is the print setting for pull printing. In a case where the relay server 104 determines that the first conflict occurs with the print setting for pull printing that is identified in step S1204 (YES in step S1205), the processing proceeds to step S1206. In a case where the relay server 104 determines that the first conflict does not occur with the print setting for pull printing that are identified in step S1204 (NO in step S1205), the processing proceeds to step S1207.

In step S1206, the relay server 104 changes the setting detail of the print setting for pull printing, to resolve the first conflict. The setting detail to be changed herein is the setting detail of the print setting stored in the relay server 104, and the setting detail of the print setting stored in the service server 106 is not changed. The processing is performed as in step S1005, except that the change target is the print setting for pull printing. Then, the processing proceeds to step S1207. According to the present exemplary embodiment, the first conflict with the print setting for pull printing is also resolved because the setting detail with which the first conflict occurs cannot be displayed on a setting display screen.

In step S1207, the relay server 104 determines whether the second conflict occurs with the print setting for pull printing that is identified in step S1204, based on the model type information about the MFP 102. In a case where the processing of step S1205 and/or processing of step S1212 are performed, the determination is performed on the changed print setting for pull printing. The determination is performed as in step S1007, except that the determination target is the print setting for pull printing. In a case where the relay server 104 determines that the second conflict occurs with the print setting for pull printing that is identified in step S1204 (YES in step S1207), the processing proceeds to step S1208. In a case where the relay server 104 determines that the second conflict does not occur in the print setting for pull printing that is identified in step S1204 (NO in step S1207), the processing proceeds to step S1209.

Figure 13:
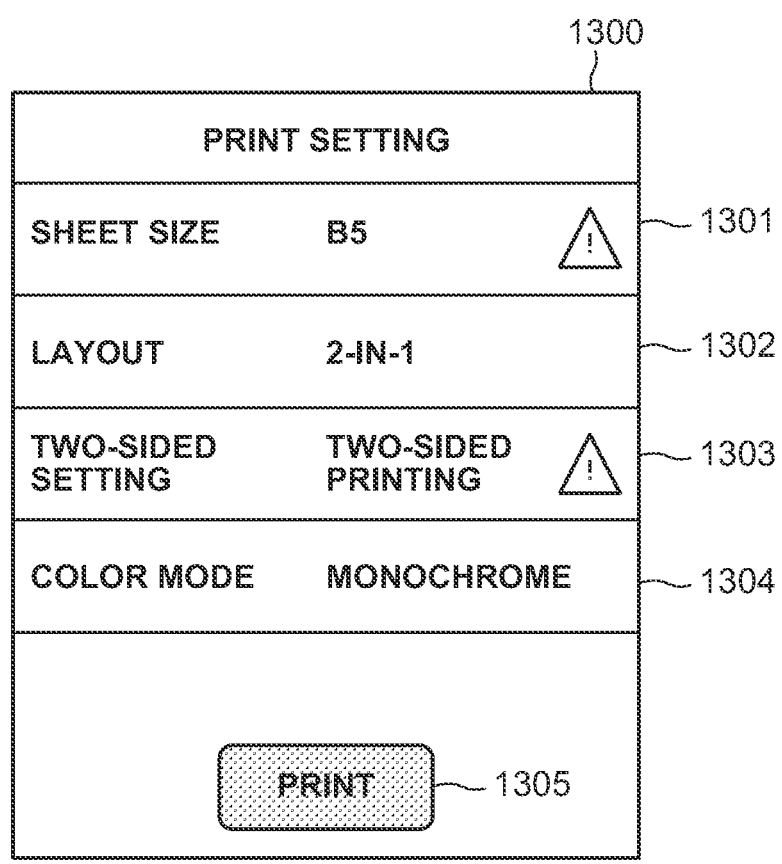
FIG. 13 is a diagram illustrating an example of a setting display screen.

In step S1208, the relay server 104 generates information for displaying of a setting display screen subjected to notification processing, in order to notify the user that the current print setting for pull printing does not correspond to the model type information about the MFP 102 or that the MFP 102 cannot perform printing using the current print setting for pull printing. Specifically, for example, the relay server 104 performs, as the notification processing, processing on display of the setting detail of the item in the print setting for pull printing, so that the setting detail of the item included in the combination with which the second conflict occurs is emphasized in comparison with the setting details of the items that are not included in the combination with which the second conflict occurs. Specifically, for example, information for displaying a setting display screen 1300 illustrated in FIG. 13 is generated. The setting display screen 1300 illustrated in FIG. 13 is a screen including areas 1301 to 1304 and is of a case where the setting detail of the item for selection between two-sided printing and one-sided printing indicates two-sided printing, the setting detail of the item for selection of a print sheet size indicates B5, and the combination of the setting details of the two items causes the second conflict. Thus, the area 1301 of a sheet size indicating the setting detail of the item for selection of a print sheet size and the area 1303 of a two-sided setting indicating the setting detail of the item for selection between two-sided printing and one-sided printing are emphasized by a predetermined mark (icon) on the areas 1301 and 1303. Methods for the emphasis are not limited to those described above and, for example, an area corresponding to an item causing the second conflict is displayed in more noticeable color than that of an area corresponding to an item not causing the second conflict. Further, for example, an area corresponding to an item causing the second conflict can be surrounded by a frame. Further, the notification processing can be a display of a message indicating that the current print setting for pull printing do not correspond to the model type information about the MFP 102 or that the MFP 102 cannot perform printing using the current print setting for pull printing. In a state where the second conflict occurs, the MFP 102 cannot perform printing based on the current print setting for pull printing, and thus, a print button 1305 for performing printing by the MFP 102 based on the current print setting for pull printing is controlled not to be operated. Then, the processing proceeds to step S1210.

In step S1209, the relay server 104 generates information for displaying a setting display screen without the notification processing. An example of the setting display screen without the notification processing is the setting display screen 900. Then, the processing proceeds to step S1210.

In step S1210, the relay server 104 transmits the information generated in step S1208 or S1209 to the MFP 102. Consequently, the MFP 102 displays the setting display screen 900 or the setting display screen 1300.

In step S1211, the relay server 104 receives a request from the MFP 102 and determines whether the received request is a request to change the print setting. In a case where the request is not a request to change the print setting, the request is a request to acquire the content. In a case where the relay server 104 determines that the received request is a request to change the print setting (YES in step S1211), the processing proceeds to step S1212. In a case where the relay server 104 determines that the received request is not a request to change the print setting (NO in step S1211), the processing proceeds to step S1213.

In step S1212, the relay server 104 changes the setting detail of the print setting for pull printing, based on the received request to change the print setting. The setting detail to be changed herein is the setting detail of the print setting stored in the relay server 104, and the setting detail of the print setting stored in the service server 106 is not changed. Then, the processing returns to step S1207.

In step S1213, the relay server 104 transmits, to the service server 106, a request to acquire the content to be printed by the print job selected on the list screen 800. The processing corresponds to the processing performed by the relay server 104 in step S708.

In step S1214, the relay server 104 receives the URL of the first area from the service server 106. The processing corresponds to the processing performed by the relay server 104 in step S709.

In step S1215, the relay server 104 accesses the first area using the received URL and acquires the content to be printed by the print job from the first area. Then, the relay server 104 stores the acquired content in the second area.

In step S1216, the relay server 104 transmits, to the MFP 102, the URL of the second area and the print setting for use in printing the acquired content as an instruction to perform printing. Steps S1215 and S1216 correspond to the processing performed by the relay server 104 in steps S710 and S711.

In step S1217, the relay server 104 receives result information from the MFP 102 and transmits the received result information to the service server 106. The processing corresponds to the processing performed by the relay server 104 in steps S714 and S715. Then, the process in the flowchart is ended.

With the above-described configuration, the MFP 102 performs pull printing even in a case where an instruction to perform the pull printing is issued via the second print service and the print setting input to the client apparatus 101 by a user do not correspond to the model type information about the MFP 102.

Other Exemplary Embodiments

While the model type information about the MFP 102 is used in the determination of whether the first conflict occurs and the determination of whether the second conflict occurs, aspects of the present disclosure are not limited to the foregoing form, and information other than the model type information about the MFP 102 can be used in place of the model type information about the MFP 102. For example, capability information about the MFP 102 can be used in the above-described determinations. Specifically, determination of whether a setting detail of the print setting corresponds to the capability information about the MFP 102 can be made instead of the determination of whether a setting detail of the print setting corresponds to the model type information about the MFP 102.

In the above-described configuration, in a case where the first conflict occurs with the print setting for pull printing, the print setting for pull printing is automatically changed to resolve the first conflict before the list display information or the setting display information is transmitted to the MFP 102. Aspects of the present disclosure are not limited to the foregoing configuration, and even in a case where the first conflict occurs with the print setting for pull printing, the list display information or the setting display information can be transmitted to the MFP 102, without the print setting for pull printing being automatically changed to resolve the first conflict.

In the above-described configuration, in a case where the second conflict occurs with the print setting for pull printing, the relay server 104 does not automatically change the print setting for pull printing, based on the model type information about the MFP 102. Alternatively, the print setting for pull printing can be changed automatically as in a case where the second conflict occurs with the print settings for push printing.

Further, for example, the second print service application can be configured to transmit only one of a print job for pull printing and a print job for push printing. In such a case, the relay server 104 and the service server 106 can be configured to perform only one of the processing of a case where a print job for pull printing is transmitted from the second print service application and the processing of a case where a print job for push printing is transmitted from the second print service application.

Further, the processing (step S1005, step S1007, step S1205, step S1207) of determining whether the first conflict or the second conflict occurs and the processing (step S1006, step S1008, step S1206, step S1212) for resolving the first conflict or the second conflict are performed by the relay server 104 in the above-described form. Aspects of the present disclosure are not limited to the configuration, and a control apparatus according to an aspect of the present disclosure can be an apparatus other than the relay server 104. For example, a control apparatus according to an aspect of the present disclosure can be the MFP 102. In such a case, the MFP 102 receives the unchanged print setting for push printing from the relay server 104, determines whether the first conflict or the second conflict occurs with the received print setting, and performs processing for resolving the first conflict or the second conflict. Then, the MFP 102 performs printing based on the print setting for push printing that is changed by the MFP 102 in such a manner that the first conflict or the second conflict is resolved. Further, the MFP 102 receives the unchanged print setting for pull printing from the relay server 104 and determines whether the first conflict or the second conflict occurs with the received print setting. Then, the MFP 102 automatically changes the print setting to resolve the first conflict, based on the model type information about the MFP 102, applies setting notification processing to a setting display screen, and displays the obtained setting display screen. In a case where push printing is selected by the user on the second print service application, the client apparatus 101 can operate as a control apparatus according to an aspect of the present disclosure. Specifically, in a case where push printing is selected by the user on the second print service application, the determination of whether the first conflict or the second conflict occurs and the processing for resolving the first conflict or the second conflict can be performed on the client apparatus 101. Even in this case, in a case where pull printing is selected by the user on the second print service application, the relay server 104 or the MFP 102 desirably operates as a control apparatus according to an aspect of the present disclosure.

Further, both the processing of determining whether the first conflict occurs and the processing of determining whether the second conflict occurs and both the processing for resolving the first conflict and the processing for resolving the second conflict are performed in the above-described configuration. Aspects of the present disclosure are not limited to the foregoing configuration, and only one of the processing of determining whether the first conflict occurs and the processing of determining whether the second conflict occurs can be performed. Similarly, only one of the processing for resolving the first conflict and the processing for resolving the second conflict can be performed. In such a case, even though the MFP 102 attempts to perform printing in the presence of one of the first and second conflicts, in a state where one of the first and second conflicts occurs, the MFP 102 does not perform printing due to an error.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-169498, filed Oct. 15, 2021, which is hereby incorporated by reference herein in its entirety.

What is claimed is:

1. A predetermined server comprising:
one or more processors; and
at least one memory coupled to the one or more processors and having stored thereon instructions, which when executed by the one or more processors, cause the predetermined server to:
perform change processing for changing a setting detail of a print setting input to a terminal apparatus outside the predetermined server;
transmit, to a printing apparatus outside the predetermined server, setting display information for displaying of a setting detail of a print setting for pull printing; and
perform, in a case where a print job for push printing is transmitted from the terminal apparatus, push printing processing to cause the printing apparatus to perform the push printing based on the print job for the push printing and a setting detail of a print setting for the push printing, without a user operation on the printing apparatus after the print job for the push printing is transmitted from the terminal apparatus, and perform, in a case where a print job for the pull printing is transmitted from the terminal apparatus, pull printing processing to cause the printing apparatus to perform the pull printing based on the print job for the pull printing and the setting detail of the print setting for the pull printing, in response to a user operation on the printing apparatus after the print job for the pull printing is transmitted from the terminal apparatus,
wherein, in a case where the setting detail of the print setting for the push printing input to the terminal apparatus does not satisfy a predetermined condition based on the printing apparatus, the push printing processing is performed after the change processing for changing the setting detail of the print setting for the push printing not satisfying the predetermined condition to a setting detail of a print setting for the push printing satisfying the predetermined condition is performed, and
wherein, in a case where the setting detail of the print setting for the pull printing input to the terminal apparatus does not satisfy the predetermined condition, the setting display information is transmitted to the printing apparatus without the change processing for changing the setting detail of the print setting for the pull printing not satisfying the predetermined condition to a setting detail of a print setting for the pull printing satisfying the predetermined condition.

2. The predetermined server according to claim 1, wherein a case where the predetermined condition is not satisfied is a case where a combination of a setting detail of at least one item in the print setting input to the terminal apparatus and another setting detail of at least one other item in the print setting input to the terminal apparatus does not correspond to model type information about the printing apparatus or capability information about the printing apparatus, and
wherein the change processing for changing the setting detail of the print setting input to the terminal apparatus not satisfying the predetermined condition to a setting detail satisfying the predetermined condition is processing for changing at least one of the setting details of the combination to a different setting detail.

3. The predetermined server according to claim 1, wherein, in a case where the setting detail of the print setting for the push printing input to the terminal apparatus is based on the printing apparatus and does not satisfy a specific condition different from the predetermined condition, the push printing processing is performed after the change processing for changing the setting detail of the print setting for the push printing not satisfying the specific condition to a setting detail of a print setting for the push printing satisfying the specific condition is performed, and
wherein, in a case where the setting detail of the print setting for the pull printing input to the terminal apparatus does not satisfy the specific condition, the setting display information is transmitted to the printing apparatus after the change processing for changing the setting detail of the print setting for the pull printing not satisfying the specific condition to a setting detail of a print setting for the pull printing satisfying the specific condition is performed.

4. The predetermined server according to claim 3, wherein a case where the specific condition is not satisfied is a case where the setting detail of the print setting input to the terminal apparatus does not correspond to model type information about the printing apparatus or capability information about the printing apparatus, and
wherein the change processing for changing the setting detail of the print setting input to the terminal apparatus not satisfying the specific condition to the setting detail satisfying the specific condition is processing for changing the setting detail of the print setting input to the terminal apparatus not satisfying the specific condition to another setting detail.

5. The predetermined server according to claim 4, wherein control is performed such that the another setting detail that is set in the changing by the change processing for changing the setting detail of the print setting input to the terminal apparatus not satisfying the specific condition to the setting detail satisfying the specific condition is a setting detail not included in the combination that does not correspond to the model type information about the printing apparatus or the capability information about the printing apparatus.

6. The predetermined server according to claim 1, wherein a case where the predetermined condition is not satisfied is a case where the setting detail of the print setting input to the terminal apparatus does not correspond to model type information about the printing apparatus or capability information about the printing apparatus, and
wherein the change processing for changing the setting detail of the print setting not satisfying the predetermined condition to the setting detail satisfying the predetermined condition is processing for changing the setting detail not satisfying the predetermined condition to another setting detail.

7. The predetermined server according to claim 1, wherein, in a case where the setting detail of the print setting for the pull printing input to the terminal apparatus does not satisfy the predetermined condition, the setting display information for emphasis displaying of the setting detail of the print setting for the pull printing not satisfying the predetermined condition in comparison with displaying of a setting detail of the print setting for the pull printing satisfying the predetermined condition is transmitted to the printing apparatus.

8. The predetermined server according to claim 7, wherein, in a case where the setting detail of the print setting for the pull printing input to the terminal apparatus does not satisfy the predetermined condition, the setting display information for displaying of a predetermined mark together with an area corresponding to the setting detail of the print setting for the pull printing not satisfying the predetermined condition is transmitted to the printing apparatus.

9. The predetermined server according to claim 1, wherein the change processing is performed based on information transmitted from the printing apparatus in response to an operation on a screen displayed on the printing apparatus using the setting display information.

10. The predetermined server according to claim 1, wherein the instructions, when executed by the one or more processors, further cause the predetermined server to transmit list display information for displaying of a list of print jobs for the pull printing to the printing apparatus, based on information transmitted from the printing apparatus in response to an operation for the pull printing on the printing apparatus.

11. The predetermined server according to claim 10, wherein the setting display information is transmitted to the printing apparatus based on information transmitted from the printing apparatus in response to an operation performed on the printing apparatus after the list is displayed on the printing apparatus using the list display information.

12. The predetermined server according to claim 10,
wherein the print job for the pull printing is transmitted from the terminal apparatus to a specific server outside the predetermined server,
wherein information about the list of print jobs for the pull printing is acquired from the specific server, and
wherein the list display information is generated based on the information about the list of print jobs for the pull printing.

13. The predetermined server according to claim 12,
wherein the setting detail of the print setting input to the terminal apparatus is transmitted from the terminal apparatus to the specific server, and
wherein the predetermined server acquires the setting detail of the print setting input to the terminal apparatus from the specific server.

14. The predetermined server according to claim 1, wherein the printing apparatus is an apparatus that performs a print function using an inkjet method.

15. The predetermined server according to claim 1, wherein, in a case where the push printing or the pull printing is performed by the printing apparatus, information about a result of the push printing or the pull printing is acquired from the printing apparatus.

16. The predetermined server according to claim 1, wherein the predetermined server includes a single information processing apparatus or a plurality of information processing apparatuses.

17. A method for controlling a predetermined server, the method comprising:
performing change processing for changing a setting detail of a print setting input to a terminal apparatus outside the predetermined server;
transmitting, to a printing apparatus outside the predetermined server, setting display information for displaying of a setting detail of a print setting for pull printing; and
performing, in a case where a print job for push printing is transmitted from the terminal apparatus, push printing processing to cause the printing apparatus to perform the push printing based on the print job for the push printing and a setting detail of a print setting for the push printing, without a user operation on the printing apparatus after the print job for the push printing is transmitted from the terminal apparatus, and performing, in a case where a print job for the pull printing is transmitted from the terminal apparatus, pull printing processing to cause the printing apparatus to perform the pull printing based on the print job for the pull printing and the setting detail of the print setting for the pull printing, in response to a user operation on the printing apparatus after the print job for the pull printing is transmitted from the terminal apparatus,
wherein, in a case where the setting detail of the print setting for the push printing input to the terminal apparatus does not satisfy a predetermined condition based on the printing apparatus, the push printing processing is performed after the change processing for changing the setting detail of the print setting for the push printing not satisfying the predetermined condition to a setting detail of a print setting for the push printing satisfying the predetermined condition is performed, and
wherein, in a case where the setting detail of the print setting for the pull printing input to the terminal apparatus does not satisfy the predetermined condition, the setting display information is transmitted to the printing apparatus without the change processing for changing the setting detail of the print setting for the pull printing not satisfying the predetermined condition to a setting detail of a print setting for the pull printing satisfying the predetermined condition.

18. A non-transitory computer-readable storage medium storing executable instructions, which when executed by one or more processors of the predetermined server, cause the predetermined server to perform the method according to claim 17.

19. A system comprising:
a predetermined server; and
a printer,
wherein the predetermined server includes:
first one or more processors; and
first at least one memory coupled to the first one or more processors and having stored thereon instructions, which when executed by the first one or more processors, cause the predetermined server to:
perform change processing for changing a setting detail of a print setting input to a terminal apparatus outside the predetermined server;
transmit, to a printing apparatus outside the predetermined server, setting display information for displaying of a setting detail of a print setting for pull printing; and
perform, in a case where a print job for push printing is transmitted from the terminal apparatus, push printing processing to cause the printing apparatus to perform the push printing based on the print job for the push printing and a setting detail of a print setting for the push printing, without a user operation on the printing apparatus after the print job for the push printing is transmitted from the terminal apparatus, and perform, in a case where a print job for the pull printing is transmitted from the terminal apparatus, pull printing processing to cause the printing apparatus to perform the pull printing based on the print job for the pull printing and the setting detail of the print setting for the pull printing, in response to a user operation on the printing apparatus after the print job for the pull printing is transmitted from the terminal apparatus, wherein, in a case where the setting detail of the print setting for the push printing input to the terminal apparatus does not satisfy a predetermined condition based on the printing apparatus, the push printing processing is performed after the change processing for changing the setting detail of the print setting for the push printing not satisfying the predetermined condition to a setting detail of a print setting for the push printing satisfying the predetermined condition is performed, and wherein, in a case where the setting detail of the print setting for the pull printing input to the terminal apparatus does not satisfy the predetermined condition, the setting display information is transmitted to the printing apparatus without the change processing for changing the setting detail of the print setting for the pull printing not satisfying the predetermined condition to a setting detail of a print setting for the pull printing satisfying the predetermined condition, wherein the printer includes:

second one or more processors; and second at least one memory coupled to the second one or more processors and having stored thereon instructions, which when executed by the second one or more processors, cause the predetermined server to:

perform print processing by using the push printing or the pull printing.

* * * * *